US006923124B2

(12) United States Patent
Roane

(10) Patent No.: US 6,923,124 B2
(45) Date of Patent: Aug. 2, 2005

(54) TRITRACK SYSTEM OF MASS TRANSIT

(76) Inventor: Jerry M. Roane, 101 S. Laurelwood Dr., Austin, TX (US) 78733

( * ) Notice: Subject to any disclaimer, the term of this patent is extended or adjusted under 35 U.S.C. 154(b) by 24 days.

(21) Appl. No.: 10/606,856

(22) Filed: Jun. 26, 2003

(65) Prior Publication Data

US 2004/0011242 A1 Jan. 22, 2004

Related U.S. Application Data

(60) Provisional application No. 60/391,701, filed on Jun. 26, 2002.

(51) Int. Cl.[7] ................................................. B61C 7/00
(52) U.S. Cl. ....................... 104/124; 104/118; 105/72.2; 105/141
(58) Field of Search ................................. 104/124, 125, 104/118, 119, 120, 242, 130.11, 130.01, 130.03, 130.05, 130.06; 105/72.2, 141, 144

(56) References Cited

U.S. PATENT DOCUMENTS

| 2,977,892 | A | | 4/1961 | Ihmig | 104/26 |
|---|---|---|---|---|---|
| 3,118,392 | A | | 1/1964 | Zimmerman | 104/88 |
| 3,447,481 | A | | 6/1969 | Gorham | 104/120 |
| 3,472,176 | A | * | 10/1969 | Trent | 104/130.11 |
| 3,487,789 | A | | 1/1970 | Gamer | 105/149 |
| 3,983,952 | A | * | 10/1976 | McKee | 280/778 |
| 4,018,410 | A | * | 4/1977 | Renaux | 705/8 |
| 4,987,833 | A | | 1/1991 | Antosh | 104/118 |
| 5,473,233 | A | | 12/1995 | Stull et al. | 318/587 |
| 5,797,330 | A | * | 8/1998 | Li | 104/28 |
| 5,845,583 | A | | 12/1998 | Jensen | 105/72.2 |
| 6,318,274 | B1 | * | 11/2001 | Park | 104/88.02 |
| 6,450,103 | B2 | | 9/2002 | Svensson | 104/120 |

FOREIGN PATENT DOCUMENTS

| JP | 54-70505 | * | 6/1979 | |
|---|---|---|---|---|
| WO | 91/18777 | | 12/1991 | ........... B61B/13/00 |

OTHER PUBLICATIONS

International PCT Search Report with Notification of Transmittal PCT/US/03/20213; 8 pages, Mailed Nov. 20, 2003.
Zahm, A.F., et al.; "Report No. 291, Drag of C–Class Airship Hulls of Various Fineness Ratios", XP002260269, Aerodynamical Laboratory, U.S. Navy, Washington; Internet Article retrieved from URL:naca.larc.nasa.gov on Nov. 4, 2003; 15 pages.

* cited by examiner

*Primary Examiner*—Mark T. Le
(74) *Attorney, Agent, or Firm*—Baker Botts L.L.P.

(57) ABSTRACT

A rail system for transporting dual use vehicles includes a network of multiple non-interconnected rails where each rail comprises an extruded triangular shell and a support material. The rails are supported by a system of support structures where each support structure includes a base with a rail adjustment actuator for selectively adjusting the position of the supported rail. Each rail is sized to support a standardized dual use passenger vehicle adapted for roadway and rail travel.

6 Claims, 6 Drawing Sheets

TRITRACK SYSTEM OF MASS TRANSIT

CROSS-REFERENCE TO RELATED APPLICATIONS

This application claims the benefit of U.S. Provisional Application Ser. No. 60/391,701 entitled "*TriTrack System of Mass Transit*" filed by Roane on Jun. 26, 2002.

TECHNICAL FIELD OF THE INVENTION

The present invention relates in general to the field of transportation systems and specifically to a modal monorail system and vehicle for use thereon.

BACKGROUND OF THE INVENTION

Conventional mass bus or rail transit systems require passengers to assemble at and then disseminate from a bus stop or rail station. Such assemblages typically do not represent the least distance from a start point to destination point and often require significant additional travel.

Additionally, conventional mass transit systems often do not adequately account for societal pressures and needs. For example, passengers are often uncomfortable when forced into a small private space with strangers (such as a crowded bus or train) due to concerns such as personal space and safety. Personal transportation is likely to remain preferred as evidenced in regions where subsidized public transportation ridership remains low as car traffic dramatically increases.

Traditional travel in automobiles may alleviate many problems associated with public transportation systems, however, traditional automobiles have many well known drawbacks. Conventional automobiles contribute to increased air pollution, typically have a limited life, and require a significant amount of space for parking.

Some existing transit systems such as RUF and MAT systems have attempted to combine some of the benefits of rail and bus systems, but also have significant drawbacks. The RUF system provides a car or bus that can drive both on roadways and also on an elevated electrified monorail. The entire vehicle moves from the surface roads to the elevated rail. The RUF car has a longitudinal hole down the center of the vehicle. The MAT concept switches out the entire drive-train frame under a containerized passenger compartment. This allows the vehicle to move from different propulsion systems without unloading and loading the passenger compartment.

SUMMARY OF THE INVENTION

In accordance with teachings of the present disclosure, an improved transportation system and method are described.

In one aspect, a dual use vehicle for monorail and roadway travel is disclosed. The dual use vehicle includes a carriage body with a track engagement slot formed in the carriage body to engage a triangular rail. A linear motor is installed within the carriage body to provide power for travel along a triangular rail. A modular power module is also included which may selectively engage the track engagement slot of the carriage body when disengaged from the rail to provide power to the carriage body for roadway travel when disengaged from the triangular rail.

In another aspect, a rail system for transporting dual use vehicles is described. The rail system includes a network of multiple non-interconnected rails where each rail comprises an extruded triangular shell pumped with concrete. The rails are supported by a system of support structures where each support structure includes a base and a rail adjustment actuator for selectively adjusting the position of the supported rail. Also, each rail is sized to support a standardized dual use passenger vehicle adapted for roadway and rail travel.

In yet another aspect, a transportation system is described that includes a system of linear rails able to support dual use vehicles where each rail includes an entrance point and an exit point. Each vehicle includes a linear electric motor and a metal wheel assembly for travel along the rails. The system also includes providing a power module station associated with each rail entrance point and exit point, the entrance point power module station able to receive modular power modules removed from vehicles prior to entrance onto the rail and the exit point power module station able to provide a modular power module to vehicles exiting the rail.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments and their advantages are best understood by reference to FIGS. 1 through 11, wherein like numbers are used to indicate like and corresponding parts.

The present disclosure describes a mass transit system preferably applicable to current mid-continent American cities with a minimum impact on the social aspect of travel. More specifically, the transportation system is a modal monorail system also referred to as a "TriTrack" preferably designed to produce point-to-point travel at very high speed and low cost while preserving the private nature of the-travel experience.

Figure 1:
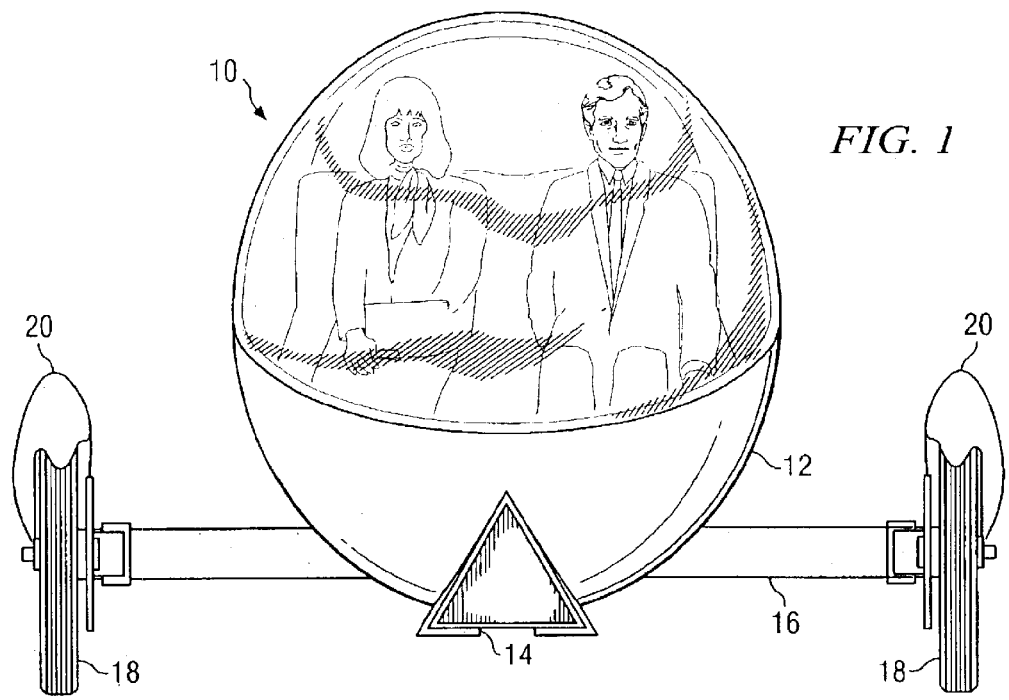
FIG. 1 is front view of a vehicle according to the teachings of the present disclosure.

Now referring to FIG. 1, a vehicle depicted generally at 10 is aerodynamically optimized and is able to travel both on a monorail track (as described in FIG. 3) and on existing roadways. Vehicle 10 (which may also be referred to a carriage) includes outer carriage body 12 that has a generally circular cross section and generally corresponds to the shape of a C-class type airship hull to maximize aerodynamic efficiency. Carriage body 12 includes a track engagement slot 14 formed to engage and allow transport along a triangular rail. For roadway travel, vehicle 10 includes front axle 16 with front wheels 18 and brake assemblies 20 incorporated therewith. Vehicle 10 preferably incorporates conventional control components to operate the vehicle for roadway travel. Additionally, during roadway travel, vehicle 10 incorporates a modular power module as described in FIG. 5, below that may also be generally referred to herein as a "mule" or a power module.

During rail travel, vehicle 10 engages a triangular track 100 (as described in FIG. 3), along track receiving slot 14. Vehicle preferably incorporates a power source (such as a battery) to power a, such as a linear motor, within vehicle 10 (not expressly shown). Such a motor preferably utilizes an assembly including metal rollers and high speed bearings to allow for low friction travel along the triangular track 100 and also includes a braking assembly able to selectively provide braking force directly to three sides of the triangular track 100.

As contemplated herein, the "linear motor" above and discussed herein is directed at a linear motor component (either a strator or an armature) able to cooperate with a linear motor component incorporated into the entrances of track 100. The cooperation of the linear motor component of vehicle 10 and track 100 selectively accelerates vehicle 10 for travel along track 100. The rail-roller assembly of vehicle 10 preferably includes two steel wheels disposed generally in the front of vehicle and two steel wheels disposed in the back of vehicle to contact the top sides of track 100. The rail roller assembly also preferably includes a rubber traction wheel disposed to contact the bottom surface of track and operable to provide traction along thereon.

Figure 2:
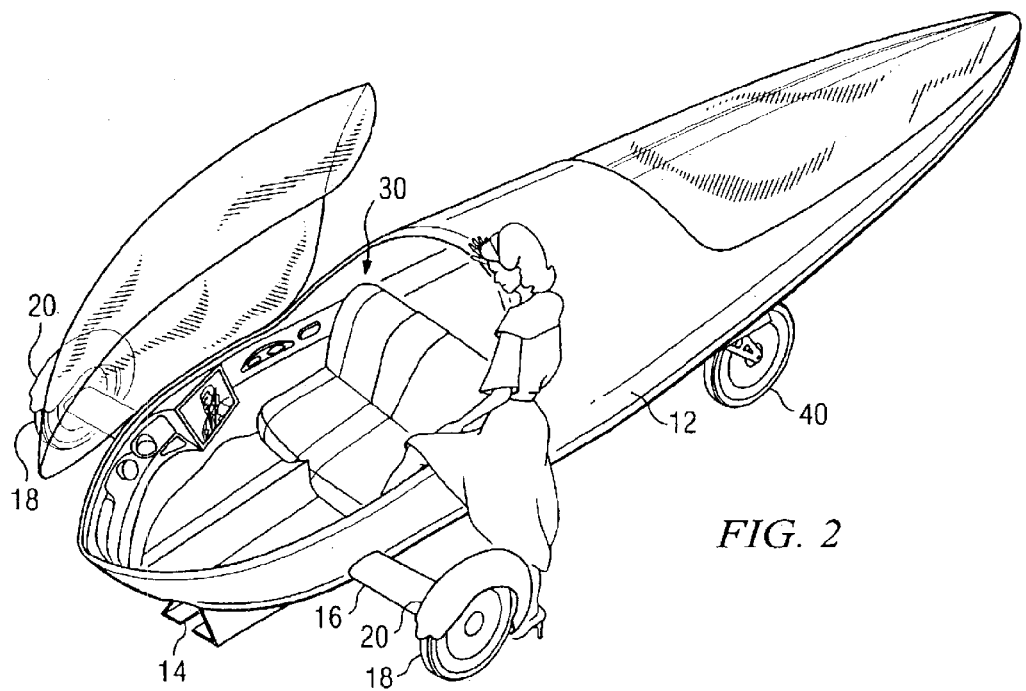
FIG. 2 is a perspective view of a vehicle according to the teachings of the present disclosure.

Now referring to FIG. 2, a perspective view of vehicle 10 is shown including interior compartment 30 suitable for passengers. As shown, vehicle 10 is preferably provided with a modular power module including rear wheel 40 and is preferably available for roadway transport.

In a preferred embodiment, the modular power module 100 and its traction motor and rear wheel assembly are preferably owned and replenished by the public sector (or utility provider) while vehicles 10 may be owned by individuals.

Vehicle 10 is aerodynamically optimized and may preferably be classified as a motorcycle, thereby simplifying the manufacturing process and eliminating many of the regulations imposed on the manufacture of automobiles. Carriage body 12 is preferably manufactured utilizing a molding process providing a monocoque form. Additional structural features may also be molded into the body.

Figure 3:
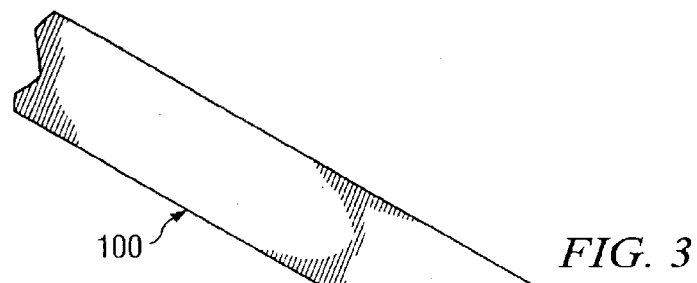
FIG. 3 is a depiction of a section of a triangular monorail track according to teachings of the present disclosure.
Figure 8:
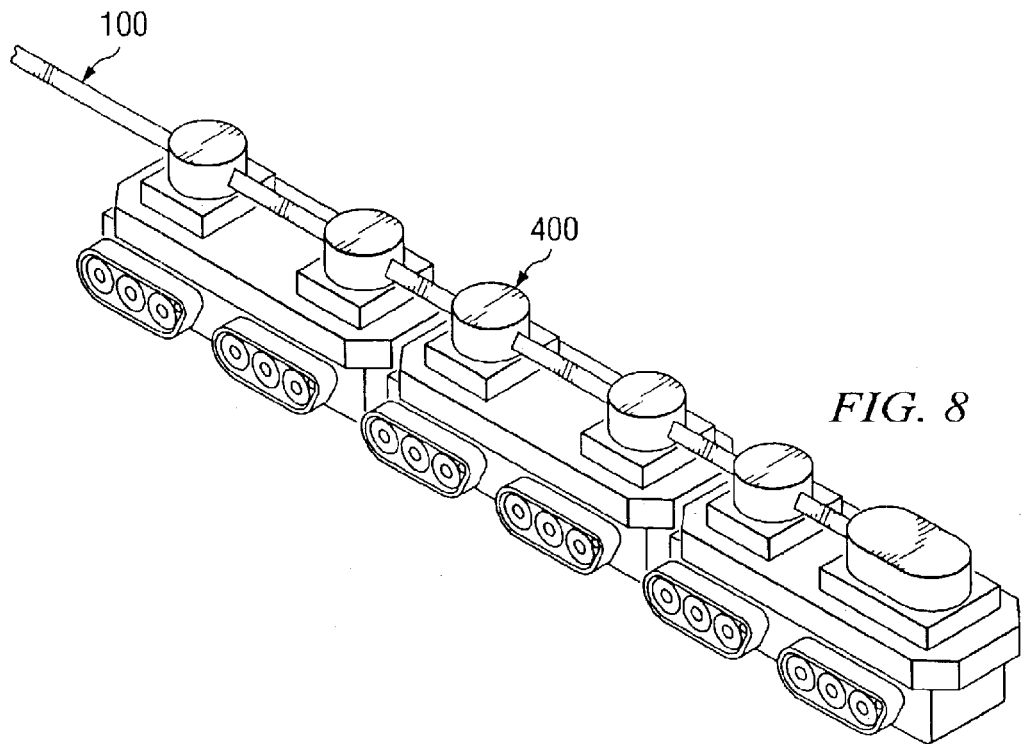
FIG. 8 is a conceptual depiction of a mobile track manufacturing vehicle.

Now referring to FIG. 3, a portion of a triangular track, depicted generally at 100, is shown which may also be generally referred to here in as a rail. Track 100 preferably includes extruded triangular'shell 110 preferably extruded from a track production vehicle, (as shown in FIG. 8). Extruded hollow aluminum shell 110 is preferably aligned along a desired trajectory which may be held by temporary supports during initial construction. Exterior triangular shell 110 preferably includes interior cavity 114 and conduit 112. Conduit may be formed during the extrusion of shell 110 or may be insert independently; accordingly, conduit 112 may be constructed of any suitable material. Further, exterior shell 110 preferably has a wall thickness and overall strength suitable to support regular operation by vehicle 10 thereon.

After initial manufacture of shell 110, cavity 114 is preferably pumped with a matrix support material such as reinforced concrete. After initial extrusion, track 100 is supported temporary supports. The temporary are later replaced with permanent support structures including foundation footings, which are used to support rail 100.

Conduit 114 may not be included in some embodiments, but preferably provides sufficient space to deliver power, communication, water or other utilities.

Extruded shell 110 of track 100 does not allow for water seepage into the concrete matrix (thereby reducing the potential for freeze damage to the rail). There is preferably limited or no traction degradation in snow or rain because track 100 is gripped by vehicle 10 (via slot 14) from all three sides. It should be noted that the vehicles 10 can not come off the track except at the mode switching locations. The energy and power requirements are greatly reduced while vehicle 10 is on track 100 because the weight of the modular power module 200 stays behind at the start of track 100. While the modular power module 200 is abandoned at the start of the track power module 200 is charged and shifted to the next exiting track, preferably in a magazine style mechanical buffer mechanism. These queues of charging power modules 200 (which may also be referred to as power module stations or power module queues) are preferably sized for an area's traffic flow. Additionally, the present invention contemplates a separate mechanism or circuit to facilitate the movement of power modules 200 deposited at a track entrance to a nearby track exit to be re-engaged with exiting vehicles 10.

Figure 4:
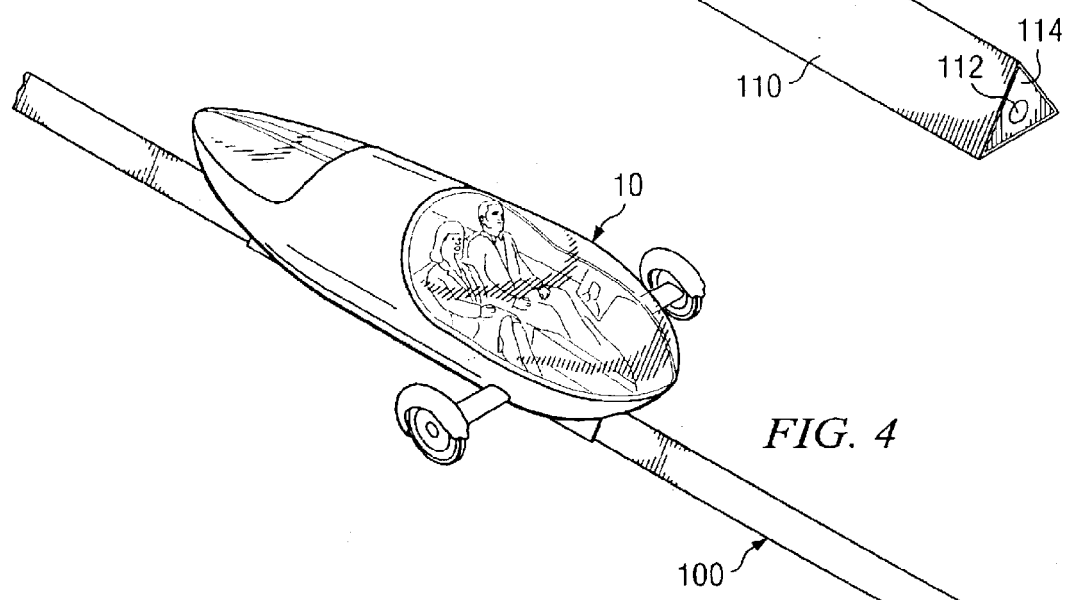
FIG. 4 is a depiction of a vehicle traveling along a track according to teachings of the present disclosure.
Figure 11:
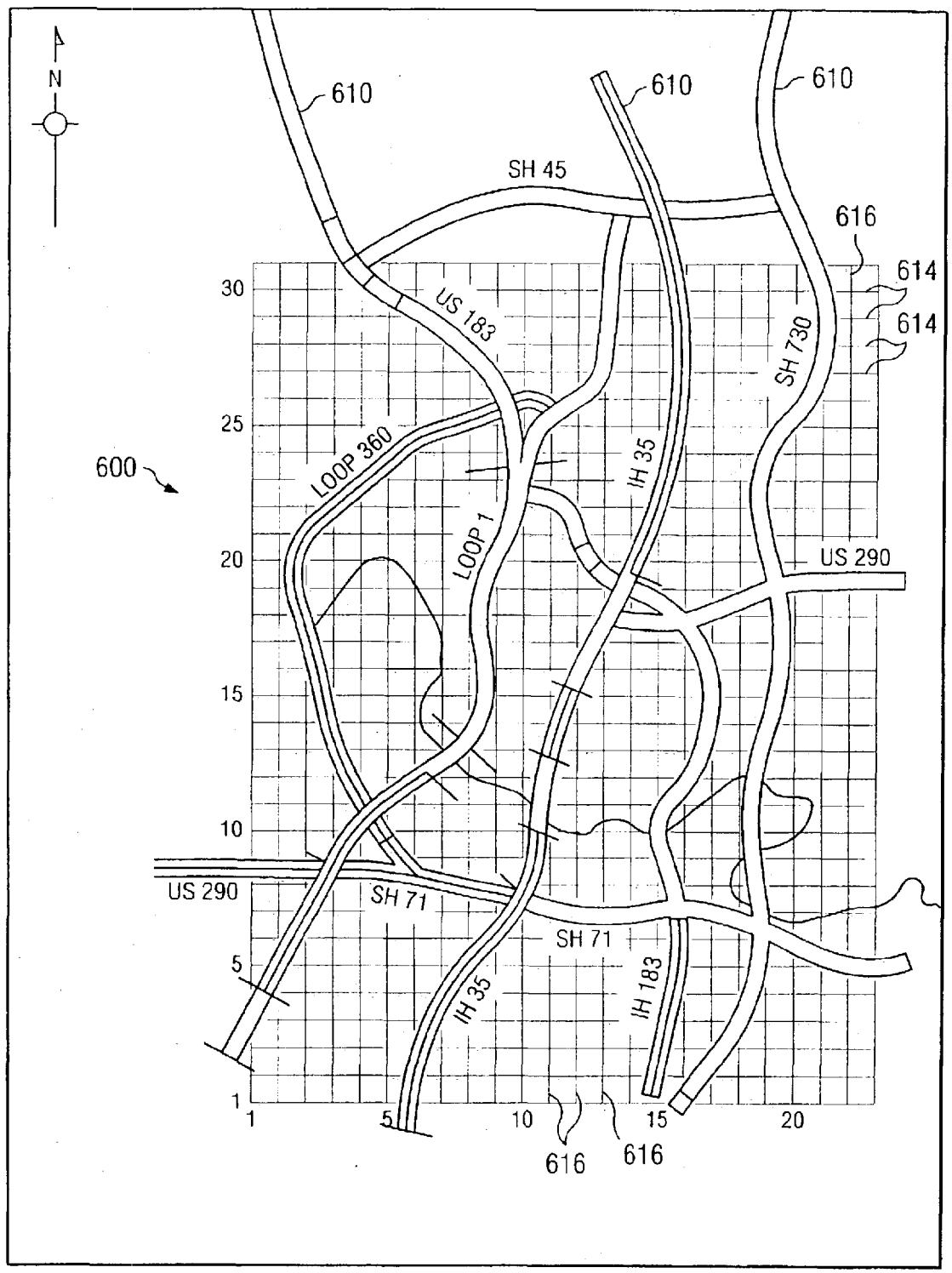
FIG. 11 is a conceptual transportation grid.

Now referring to FIG. 4, vehicle 10 preferably engages rail 100 along track receiving slot 14 for travel along rail 100. In the present transit system also referred herein as a "Tri-track" system, drivers preferably make short trips in a personal vehicle (such as vehicle 10) to access a public high-speed grid 600 (as shown in FIG. 11). The TriTrack system preferably combines high speed rail travel and existing road systems. The rail component of the TriTrack system preferably provides for a significant improvement in the speed of railway construction. Before vehicle 10 enters track 100, vehicle 10 is weighed. If vehicle 10 is over a selected operating weight, vehicle 10 is not allowed to enter track 100.

Extended TriTrack systems may reduce long distance travel time by utilizing high speed rail travel. TriTrack systems preferably provide simplified and reduced cost construction of composite vehicle and long span bridges.

Vehicle 10 is preferably constructed to maximize aerodynamic efficiency, thereby providing energy savings. Vehicle 10 preferably utilizes an electric power source (such as modular power module 200 shown in FIG. 5) thereby reducing air pollution emitting directly from vehicle 10.

Figure 5:
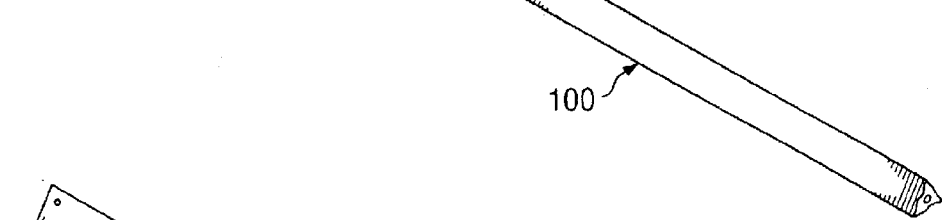
FIG. 5 is a depiction of a removable power module.
Figure 5:
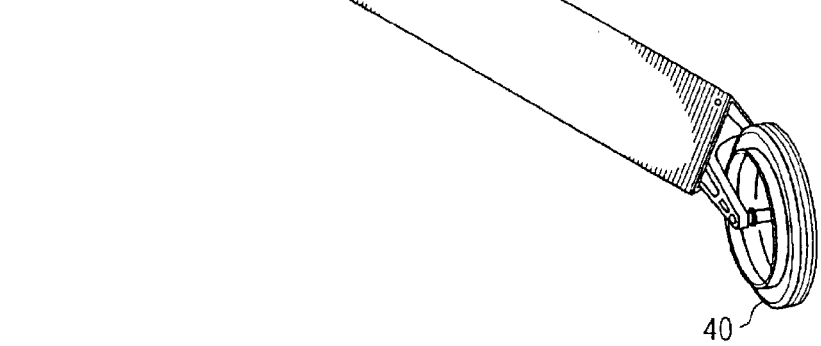

Now referring to FIG. 5, a modular power module 200 is shown. Modular power module 200 preferably includes an exterior housing sized to engage track receiving slot 14. Power module 200 also preferably includes rear wheel assembly operable to provide power for roadway travel. One important advantage of the system is the preferable shift of the drive train component, namely, modular power module 200, to public owner (including, for instance ownership by a utility provider) rather than personal ownership. To enable the TriTrack system to work most efficiently, the control of the speed and trajectory of vehicles 10 traveling on track 100 are monitored and controlled. The distribution of energy to vehicles 10 may be more efficient if provided from a centralized source. Also, the synchronization of traffic patterns and flow may be better managed under a central control system while vehicles 10 are traveling on the network of high speed tracks 600. The maintenance and production of power module 200 would preferably take advantage of economies of scale for the large scale use of this utilitarian device. The utilization of these mules 200 is preferably maintained area wide and public ownership preferably allows for these mules to charge in a queue as the mule 200 waits for the next trip. In some embodiments, the power unit (battery pack) of the mule does not have to stay with the containerized exterior of the mule 200 while the charging is accomplished.

In one preferred embodiment mule drive-train subsystem 200 is preferably formed from a section of extruded track rail 100 cut to the length of vehicle 10. This lowers the cost to manufacture these subsystems. The maintenance of the drive-train module 100 may preferably be performed at a public facility while the maintenance of the vehicle carriage 12 will be the responsibility of the private owner.

Figure 6:
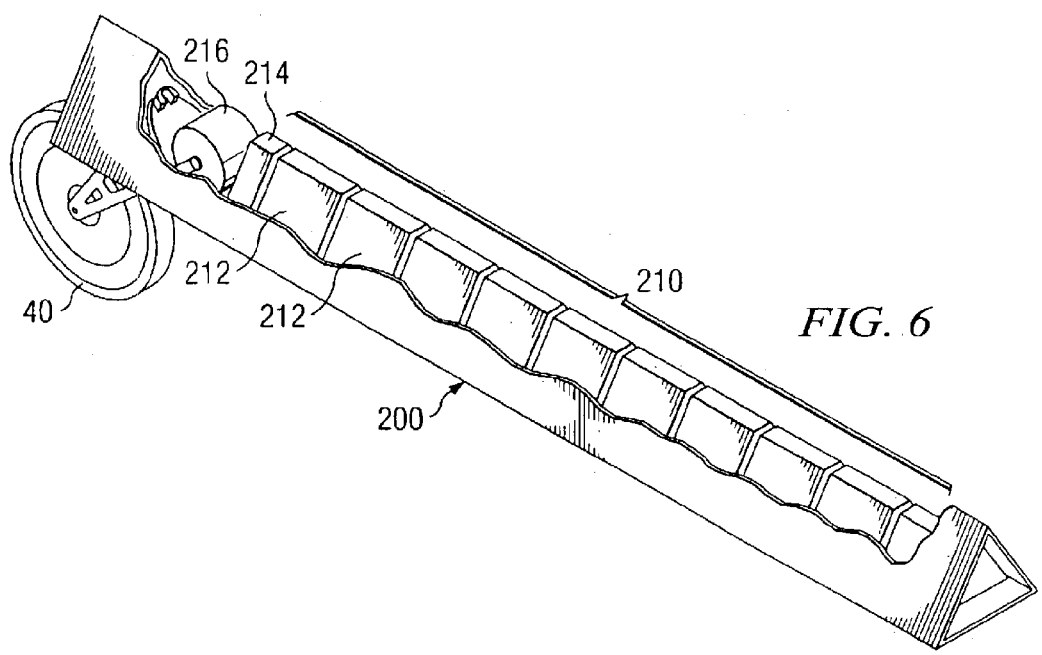
FIG. 6 is a depiction of a removable power module including a battery park.

Now referring to FIG. 6, a modular power module 200, with portions cut away, is shown. Power module 200 includes battery pack 210 including multiple power units 212. In the present embodiment, energy storage units 212 are preferably conventional batteries that may be selectively recharged by conventional means but may also include alternate energy storage means such as a flywheel, super capacitor, fuel cell, or other suitable means.

Battery pack 210 is preferably in operable communication with control unit 214. Control unit 214 is further in communication with drive motor 216. Control unit 214 is also preferably in communication with the control system associated with vehicle 10. Control unit 214 preferably and selectively manages the delivery of power from battery pack 210 to drive motor 216. Drive motor 216 then delivers power to rear wheel assembly sufficient to power vehicle 10 for roadway travel.

In one preferred embodiment, each vehicle may include a processor in communication with a wireless, redundant LAN. The wireless LAN preferably enables monitoring and management of vehicles operating in the transportation system.

The present invention contemplates a minimal introduction of buildings associated with the system. Accordingly, the system does not significantly contribute new public buildings to maintain or police. The queue of mules 200 may include a public facility to maintain, however such space is preferably designed to limit access by the general public. Vehicle 10 is preferably housed at each user's garage or driveway.

Figure 7:
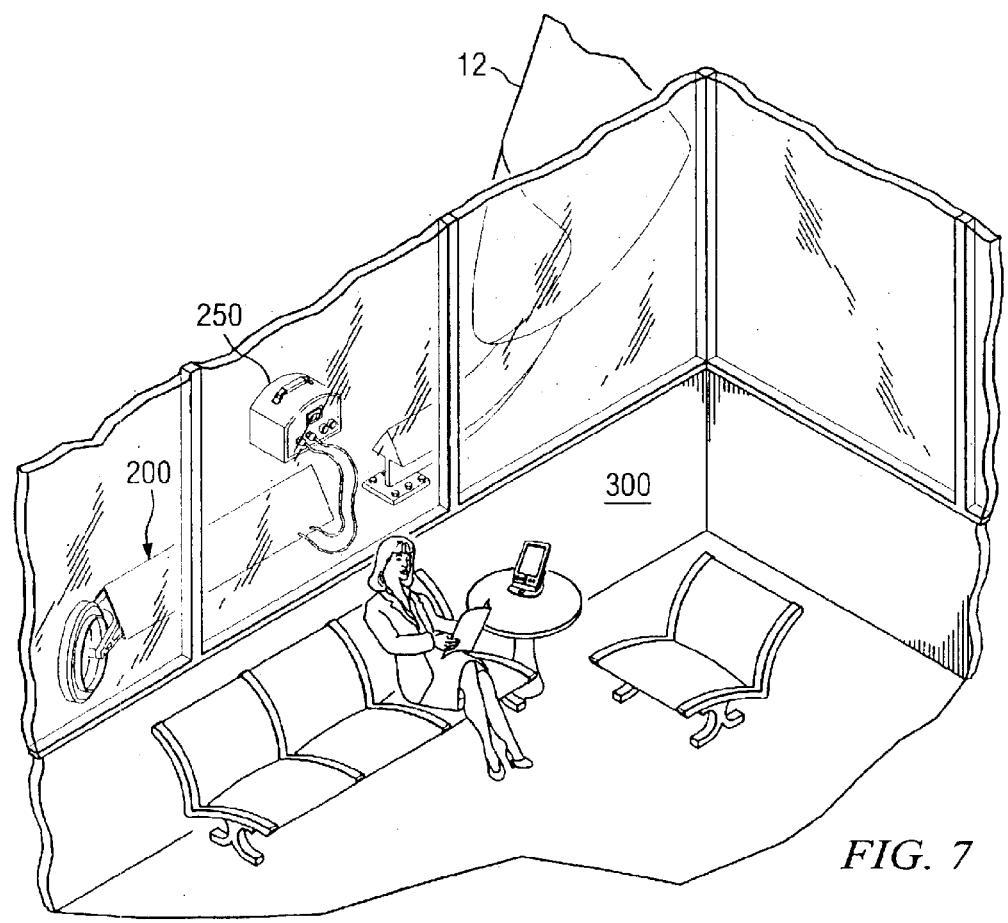
FIG. 7 is a depiction of a removable power module being re-charged.

In operation, mule 200 associated with a particular vehicle 10 may be charged via the home power grid (as at a charging station 250 at a residence 300 as shown in FIG. 7) or may be returned "empty" to the charging queue or modular power module station and the necessary monetary transactions for charging mule 200 may be conducted via modern electronic means. This preferably allows a user to have a choice as to whether to use the public energy source (at a charging station) or home energy source 250, adding a beneficial element of competition to the energy delivery system for recharging modular power module 200.

When vehicles 10 are parked during daytime hours, 200 mule will preferably not be a part of the parked vehicle 10. Preferably, only the passenger compartment and the rail drive motor are parked. Because they may operate on a track, the parking of vehicles 10 may be automated and can be packed into a small space, such as, on the tail end of the vehicle. Because there is no need to exit swinging doors (as such parking would be automated) the space between parked cars may be significantly reduced to, for example, four to six inches rather than several feet. Such an improved parking scheme could preferably require significantly less space (and may even be incorporated onto a building's roof, and allow real estate currently used for traditional parking to be utilized for more productive and profitable purposes.

FIG. 8 shows a conceptual depiction of an all terrain track production vehicle, generally depicted at 400, for manufacturing track 100. Track production vehicle 400 (also referred to as a "TriTracker") is preferably operable to extrude exterior triangular shell 110 of track 100 while in motion. Alternately, exterior triangular shell 110 may be manufactured in sections and assembled at the track site.

Extruding machine 400 will preferably manufacture track in real-time and in place and utilize subsequent rollers to shape the TriTrack according to a prescribed design layout. Once shell 110 is extruded and shaped, temporary supports may be placed at each location near where a permanent support pier will be poured. Crews will come in behind track laying machine 400 and drill the foundation holes and pour the concrete support structures. These one to four legged support points will each have the motorized adjustment module (not expressly shown) between the support point and the TriTrack. This will allow the roadway to maintain its exact path adjusting for thermal expansion, geological movements, soil moisture content, etc.

In a preferred embodiment, rail manufacturing apparatus 400 is a vehicle in which metal (such as aluminum, steel, an alloy, or engineered plastic (such as a composite material)) is extruded from a large machine that traverses the path of the TriTrack. In this preferred embodiment, extrusion machine 400 provides track at a rate between 1 and 5 miles per hour and at approximately 3 miles per hour.

Figure 9:
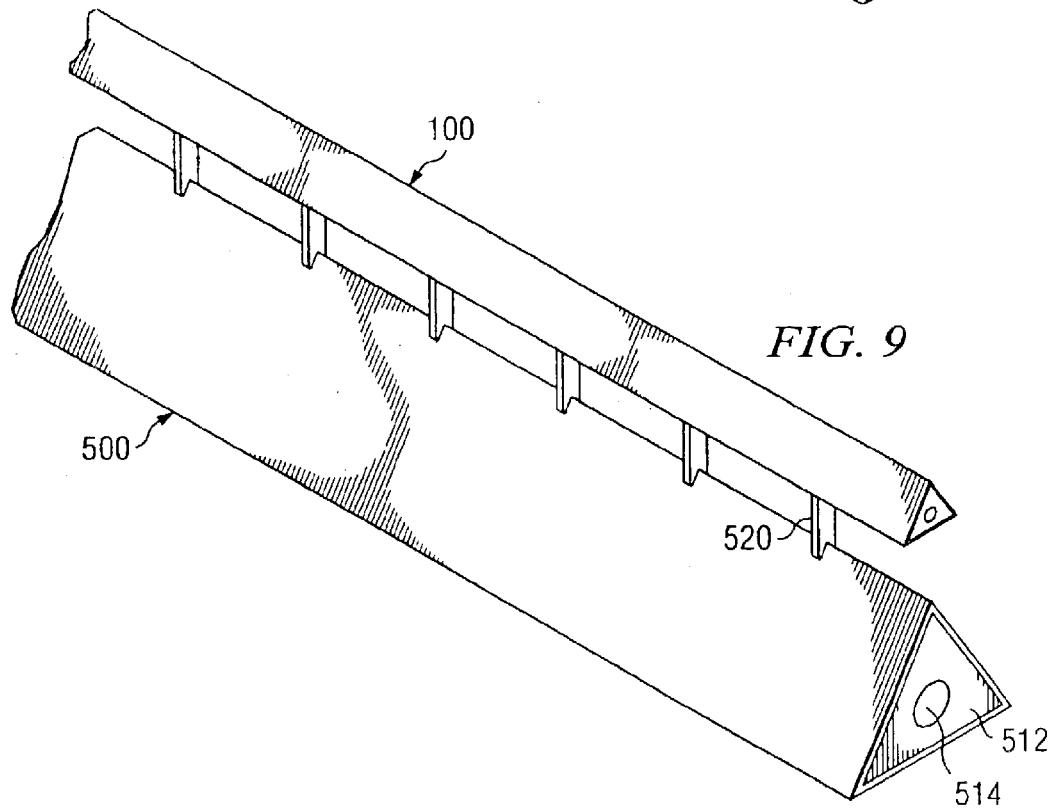
FIG. 9 is a depiction of a rail and support according to teachings of the present invention.

FIG. 9 shows a section of triangular track 100 supported by intermediate supports 520 connected to triangular base 500. Triangular base 500 comprise a metal exterior shell with a cavity 512 formed therein and filled with a support material such as concrete. Triangular base 500 further includes utility conduit 514 formed therein and sized for supporting telecommunication, power, or other utilities.

Figure 10:
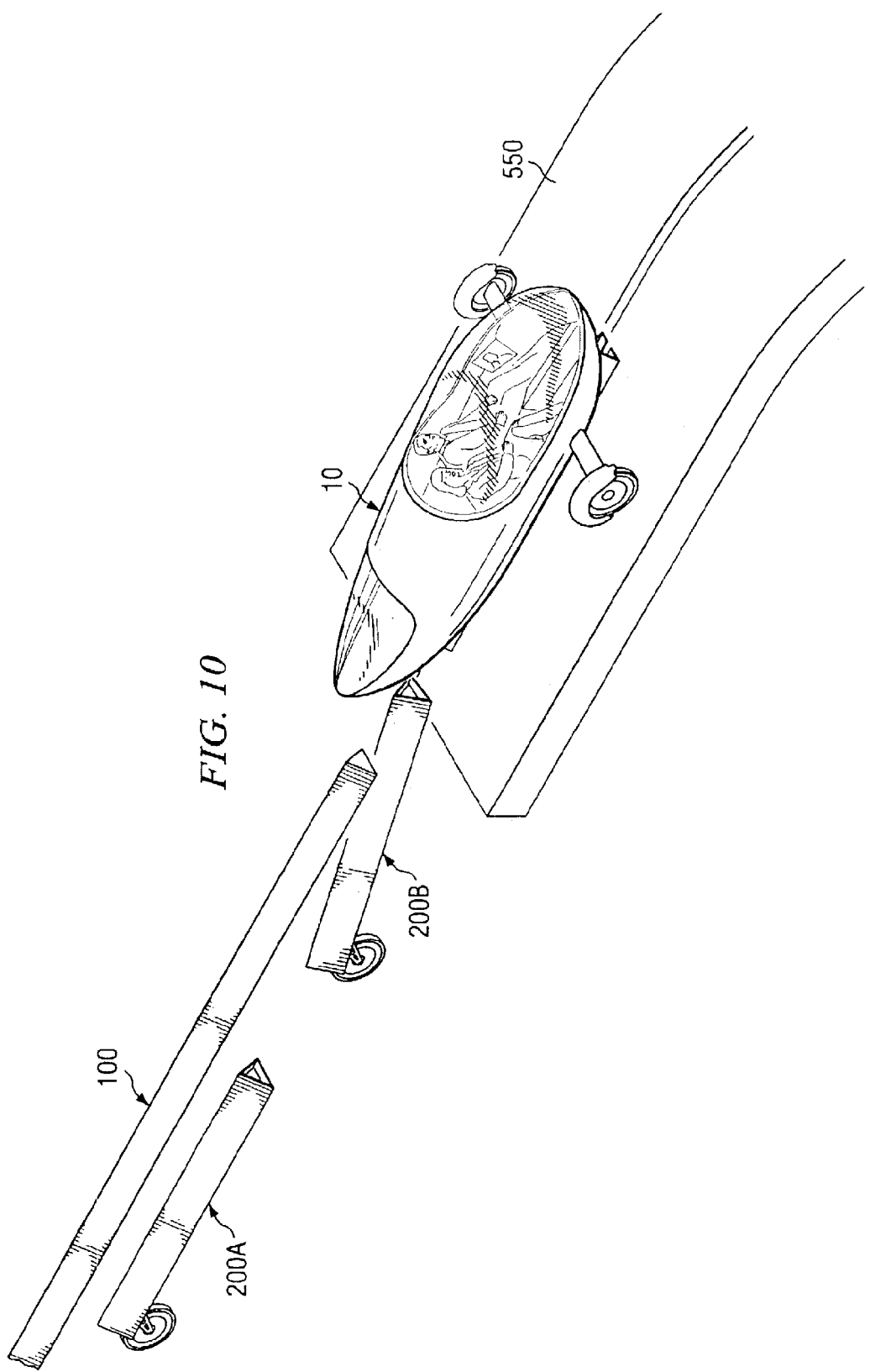
FIG. 10 is a depiction of a vehicle transferring from rail travel to road travel.

Now referring to FIG. 10, a vehicle 10 is shown exiting a rail 100 onto a roadway 550 according to the present invention. In the present embodiment, vehicle 10 preferably exits rail 100 onto roadway 550. The exit portion of rail 100 preferably includes a staging area for modular power modules 200 that have preferably been fully charged during the period in which they have not been installed within a vehicle 10. In the present embodiment, modular power module 200B is staged to be engaged with vehicle 10 to provide power for the roadway travel of vehicle 10.

Now referring to FIG. 11, a network of rails 100 may preferably be established over an existing roadway system 610 in a metropolitan area. In the present embodiment, a grid of perpendicular rails 614 and 616, running North-South and East-West, respectively, is shown. Each rail 614 and 616 may preferably include a series of rails (such as six rails) of different lengths, as described below.

Another aspect of the present invention is the weight control of vehicle 10 and the roadway and rail design specifications. This preferably allows for rails 100 and roadways to be designed to task rather than the current design which requires a significant safety factor in addition to overload conditions (such as overloaded vehicles).

Vehicle 10 may preferably operate as a traditional land vehicle. Because the high-speed grid 600 preferably incorporates facilities to recharge the existing modular power module 200, the viability of an electric car is enhanced. The TriTrack allows for short-range trips to flow together to make a complete trip. As described above, multiple modular power modules 200 rotate through a public recharging system to allow for limited or significantly reduced vehicle recharge such that replenishing the vehicle's power source will not significantly impact travel time (as battery insertion is preferably performed as vehicle 10 continues to roll). The contemplated battery charge network is analogous to the gas station network of today.

The TriTrack vehicle 10 preferably utilizes the substantially lowest aerodynamic drag coefficient of any shape of this vehicle minus the aerodynamic effect of wheels 18 and 16. In an attempt to maximize volume of vehicle 10 (specifically, body shell 12) for minimum frontal area (and therefor minimal drag) the frontal shape of a vehicle has a generally circular cross section. The invention contemplates alterations to this shape, however, significant deviation will not yield a vehicle that is maximized for efficiency. In the present embodiment, the TriTrack vehicle 10 has a generally circular cross section and preferably has a drag coefficient of 0.09.

The present invention preferably encourages a compounding of energy efficiency as each part of the transit system is designed for efficiency. This is in marked contrast to the compounding effect of many current transportation systems. The term compounding, in this instance, refers to common design of current transportation systems wherein the provision of an unnecessarily heavy or strong component, such as a suspension, in turn, requires a unnecessarily heavy engine, etc. By restricting each part of the present system to a carefully limited specification, such compounding does not significantly impair the efficiency of the entire system. In particular, the beneficial compounding of the present system carries forward to the size and cost of track 100 and grid 600. By restricting the design weight of vehicle 10 to, for example, four $95^{th}$ percentile persons (based on weight), the weight of a reduced short distance battery and drive motor are sized for metal on metal rolling and the size and the resulting strength requirements for rail 100 are reduced compared to modern roadways and rails.

On the high-speed track 100 the trajectory of vehicle 10 may preferably be adjusted in real time. Each support point of rail 100 will preferably have a centrally or networked controlled adjustment for X, Y and Z to maintain an exact trajectory of rail 100 given the small movements in the geologic features of the earth and other track movement. In a preferred embodiment, the heart-line of a passenger will be the control point for maintaining constant or slowly changing accelerations in pitch, yaw, and roll. Tilt of vehicle 10 is a function of the three dimensional shape of track 100 and is preferably defined to minimize the discomfort of the rider. The system preferably actively assists roll, tilt, and yaw to simulate the ride of a much slower vehicle using known techniques such as those employed in flight simulation systems. By using flight simulation-type techniques in reverse, the TriTrack can make the high-speed trip "less exciting" and thus more tolerable to riders. This can be accomplished because track 100 preferably has and maintains a known trajectory before vehicle 10 enters grid 600 and the active suspension may manipulate the vehicle lessen the effects from track imperfections and from know human effects (such as nausea). Vehicle 10 is supported on a set of rollers inside body 12. The tilt of the car may preferably be manipulated with servos (such as low-powered servos) to tilt the vehicle forward, backward and sideways to create a simple motion or flight simulator-type effect. By feeding this motion simulator the reverse accelerations of the known track accelerations, vehicle 10 may make the ride less noticeable to the inner ear of the rider by keeping the acceleration forces pointed down in relation to the ear. The car preferably tilts forward under power to offset the takeoff from the start of the track and it tilts back as the car decelerates at the end of the track (and in preferred embodiment utilizes such deceleration to generate electricity). The same compensation would be applied for entering and exiting curves but along a different axis.

The present system takes advantage of the reduced rolling friction metal wheels of a steel track versus that of rubber on pavement. Additionally because a small gap is maintained between track 100 and vehicle 10 (and in particular, engagement slot 14) at high speed, vehicle 10 preferably benefits from a partial air cushion between vehicle 10 and rail 100 that reduces the rolling friction of the system. Such air cushion may preferably be actively controlled.

The shaping of extended triangular shell 110 is preferably formed such that the shrinkage may be accommodated by the bulge or reverse bulge in the rolled metal. Utilities may be run down the middle of the extruded shell 110 (within a conduit 112) as a by-product of the construction process. Fiber bundles can co-exist with electric utilities down the center of the tracks 100 hiding the wires on present telephone poles.

The range of mule 200 is sufficient for most commutes and until the complete system is implemented, vehicle 10 may be driven on existing roadways like any other car. Once TriTrack grid 600 is in place, the capacity of power module 200 may be reduced because of the foreseeable reduction in required driving range.

Grid 600 preferably incorporates a number of elements that contribute to the overall safety of the system. There are no intersections of rails 100 in grid 600 and all tracks operate only in one direction. Also, there are no stoplights or stop signs. Personal safety of passengers is enhanced with private passenger compartments 30 of vehicle 10. Emergency vehicles will be able to take immediate priority because of a unified control. Trucks and heavy vehicles are not allowed on track 100 (dynamic monitoring of vehicle weight). Triangular track shape resists holding debris that might interfere with operation of vehicle 10. Each vehicle 10 also preferably incorporates a debris detection system to avoid/eject foreign objects from track 100. Because the brakes of vehicle 10 grip track 100, they can stop under extremely uniform control. Public owned drive-train mule 200 will provide a limited, preferably non-lethal, maximum top speed on surface streets.

This transit system also preferably provides enhanced greater access to all individuals, including those with handicaps. Because vehicle 10 is individually owned, the vehicle may be modified for each individual and accommodate whatever medical equipment, special chairs, breathing, or feeding support devices that may be required to accommodate a user's disability.

In a particular embodiment, the beginning track 100 may include a linear motor to assist in the acceleration of vehicle 10 to high speed (up to approximately 180 mph). This boost, via linear motor or conventional traction wheel/stationary motor will reduce the total energy production capacity required to be carried on board the rail-only vehicle 10 and the energy can be reclaimed at the exiting end of the track via a linear generator when the vehicle is slowed back down to surface street speed from the high speed rail speed.

The energy recovery from the linear motors may be utilized by the electric power provider to offset the electric load of the up ramps of the system on the power grid. The electric power provider may further utilize power modules 200 to level the load on the power grid for the day or longer time period depending on the type of energy source used. By shifting the battery storage capacity to the public sector and placing control over a city or area-wide utilization of electric power, the load on power plants may be leveled to increase the overall utilization of power generating facilities providing a public sector service for charging the vehicle power sources, may result in peak demand leveling and cost efficiency.

In another preferred embodiment, the front shape of the vehicle 10 preferably forms a scoop for directing air to the area between track 100 and the car 10. This scoop is preferably an active scoop operable to create a cushion of air that preferably provides lift by introducing higher pressure air between the vehicle 10 belly and rails 100 thereby reducing the rolling-friction between rail wheels incorporated in vehicle 10 and rail 100. The key feature of the TriTrack in this regard is that the ground shape is controlled within a few thousands of an inch. Previous systems attempting to utilize such "ground effects" have had a much rougher terrain to design for—thereby reducing the gains that present ground effects can give.

The present invention contemplates several alternate forms of grid 600. In addition to the rectilinear grid 600 of FIG. 11, a curved grid may also be utilized. A circular grid may be built that would allow for a planned community. Each circle in such a circular grid may have a zoning function where industrial complexes would be contained within a circular TriTrack and an adjacent TriTrack circle may contain light industrial businesses so as to create separation between industrial and residential areas. For high speed travel, the diameter of each circle would need to be sufficiently large. The diameter of a circle could be decreased for lower speed rail areas such as through scenic areas.

Each support for track 100 may include a platform supported by one to four legs. The four-legged support preferably allows for one of the four legs of the supports to be catastrophically removed and continue to provide support for the track above. The three legged support preferably allows for at least partial failure of support proved by the track itself in conjunction with the support platforms located before and after the damaged support to support the track but not necessarily hold the trajectory of the track flat. If three legged support platforms are used a drilling machine of common design may be used to drill to find a suitably firm footing for the platform. Temporary tubes of cardboard or reusable metal forms can be used to form a mold for concrete materials to be poured into the drilled holes and provide support for the platform and XYZ position actuators at each support location on the TriTrack. The platform construction process should attempt to be as fast as the extrusion process such that the equipment moves through an area as a set.

In a preferred embodiment tracks 100 may be laid out such that an entrance is a maximum of 1887 feet (¼ mile) from any point within the covered area. Given a half mile track grid the distance from any to an entry point is one quarter mile. If each track corridor has, as an example, six tracks going East/West and six tracks going North/South running the width of a car plus a uniform clearance of about 10 inches that makes the width of the track corridor 600 inches or 50 feet wide and each adjacent track is twice as long as the previous then the six side by side tracks are:

Track 1=½ mile long
Track 2=1 mile long
Track 3=2 miles long
Track 4=4 miles long
Tack 5=8 miles long
Track 6=16 miles long.

To facilitate travel to neighboring cities lengthier tracks may be placed in other areas.

The routing of traffic on grid 600 may preferably be managed by a central control computer to limit congestion and encourage uniform area-wide track utilization. In one embodiment, each rail section preferably has the capacity of a four lane highway and each bundle of roadways being 6 adjacent tracks wide would have the equivalent peak capacity of 6, 4 lane highways. Since the entire area would have these bundles of adjacent tracks every ½ mile the total capacity to move people would be significantly increased.

The terrain following elevation contour would be a compromise between rough ride at 180 MPH and the difficulty of building track suspended high above the ground. On flat ground the North/South TriTracks may be, for example, at 17 feet above the surface streets and the East/West TriTracks could be at 22 feet. This allows for no intersections between vehicles traveling at high speed to occur on different planes. There are no stop signs or reasons to stop other than emergency situations and in those situations having a central or networked traffic control system including redundant systems.

In another embodiment, the TriTrack grid may be circular in layout and the TriTrack would be shaped by the Tri-Tracker to provide the least jostling of the riders. Because the track is shaped by the TriTracker's pulling rollers the exact trajectory of the vehicle can be formed into the track allowing for minimal suspension components in the track only vehicle and minimum motion detected by the inner ear in yaw pitch and roll. By banking the trajectory into the curves the simulated effect is to seem to be heavier than you are. By keeping the circular radius equal throughout the circular grid the sensation of motion may preferably be reduced. When the rider goes from one circle to another circle there will be a banking swap over and the TriTrack will be able to make the transition with minimum impact on the inner ear. This layout would allow for large circular areas to be serviced by one circular track easement allowing for minimum intrusion on the landscape by vehicular travel. Each circle could be planned to fit a particular use such as housing or industrial or combinations that make sense with light industrial and shopping being together or residential and convenience stores in a circle.

The circles would be larger in diameter to keep from causing motion sickness and the center track-free area could encompass many acres. The travel into the circle would be via the minimally polluting electric or alternate energy conversion car. The transition from circle to circle could be a series of merges orchestrated by the central control computer. The track would have a local feature that would allow the car to come off the track at speed by keeping the basic shape of the TriTrack but in merge zones reducing the width of the track to, for example, 60% of its width allowing the car body to clear the track in the merge zone. This reduced track width section would be the intersection of the equilateral triangle shape with a rectangle. Where the sides of the lower part of the track are missing from a usual TriTrack. This would allow the drive wheels on the under side of track 100 to come off the track by taking the vehicle 10 up.

The present invention further contemplates additional mechanisms on vehicle 10 for automatic transfers from track to track for unmanned transport such as, for example, freight. The third track system would be defined as an open architecture feature. At track ends or at merge points on a circular track this third mode of vehicle movement would allow for the vehicles to be transferred, moved from track to track via a third independent local railway. This third rail system or grab point would take advantage of a common feature of all the cars allowed on the track that would enable a switching station to drive the vehicle to another track under automatic control. This preferably allows for movement of a vehicle without the contents of the vehicle being involved. Mail and light freight could be accomplished in this manor. Given sufficient safety track record, this could allow for driverless movement of passengers.

Although the described embodiments have been described in detail, it should be understood that various changes, substitutions and alterations may be made to the embodiments without departing from their spirit or scope.

What is claimed is:

1. A rail system for transporting dual use vehicles comprising:
   a network of a plurality of non-interconnected rails, each rail comprising an extruded triangular shell filled with support material;
   the rails supported by a plurality of supports for maintaining a selected trajectory of the rail; and
   each rail sized to support a standardized dual use vehicle adapted for roadway and rail travel,
      a track engagement slot formed to engage the triangular shell;
      a carriage body including a linear motor component operable to cooperate with the rail to form a linear motor operable to selectively transport the carriage body along the triangular raile; and
      a modular power module operable to selectively engage the track engagement slot of the carriage body when disengaged from the rail, the modular power module operable to provide power to the carriage body for roadway travel when disengaged from the triangular rail.

2. The rail system of claim 1 further comprising the plurality of non-interconnected rails generally disposed along a perpendicular grid.

3. The rail system of claim 1 wherein the non-interconnected rails are aligned in different planes.

4. The rail system of claim 1 wherein each rail comprises a vehicle entry point and a vehicle exit point, each vehicle entry point operable to regulate entry onto the rail based on vehicle weight.

5. The rail system of claim 1 wherein each rail comprises a vehicle entry point and a vehicle exit point, each vehicle entry point operable to allow each dual use vehicle entering the track to remove the modular power module associated with each vehicle and each vehicle exit point operable to facilitate the installation of a modular power module into a vehicle exiting the rail.

6. The rail system of claim 1 wherein the support material comprises concrete.

* * * * *